2,697,664

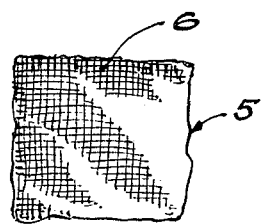
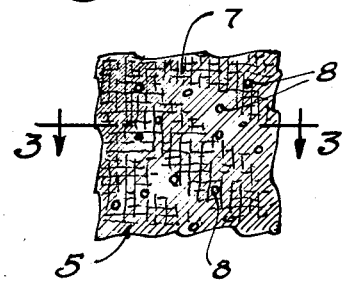
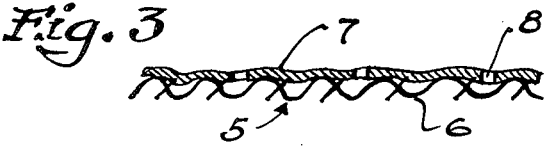
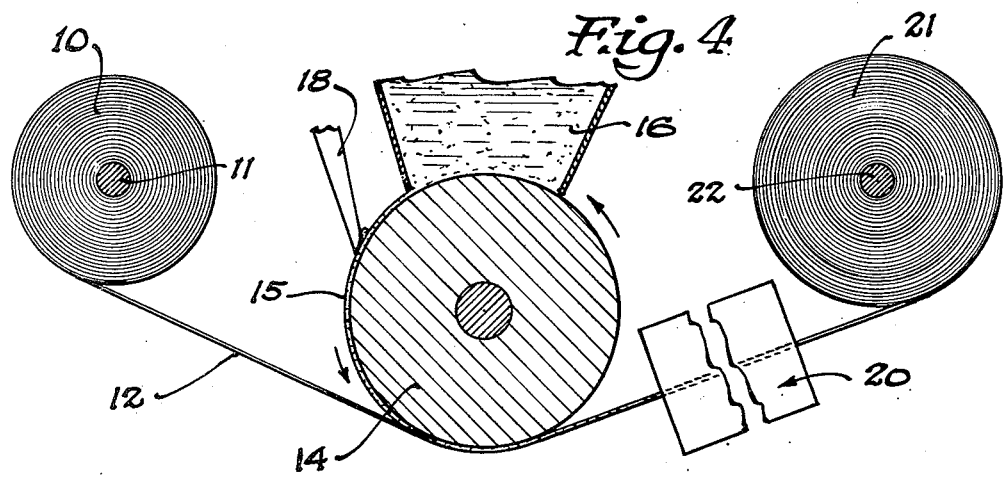

METHOD OF TREATING ANIMAL CARCASSES

Paul A. Goeser, Chicago, and Carl L. Lohner, La Grange, Ill., assignors to Swift & Company, Chicago, Ill., a corporation of Illinois Application September 20, 1950, Serial No. 185,822

7 Claims. (Cl. 99—174)

This invention relates to the treatment of meat, and has to do more particularly with the clothing of animal carcasses.

In the preparation of meat from edible animal carcasses, it is customary to clothe the freshly skinned carcass on the killing floor with a cloth, such as ordinary unbleached beef sheeting, which is preferably brine-moistened. For example, a beef carcass immediately after skinning and splitting into sides is usually promptly covered with such a cloth prior to removing the carcass to the chilling room. Also, whole lamb carcasses immediately after skinning are customarily clothed with a tightly fitting water or brine-moistened cloth before chilling. Veal carcasses are customarily chilled before skinning and such carcasses are clothed after the chilling and skinning operations have been performed.

In the clothing of warm skinned carcasses as practiced heretofore, the advantage of the cloth covering, particularly with respect to reduction in shrinkage, is most effective during the first 24 hours after skinning. Subsequent to that time the cloth becomes dry and is less effective in preventing the escape of moisture from the carcass. Consequently, it has been customary to remove the cloth after 24 hours because the cloth has largely served its original purpose and because the cloth does not provide suitable protection during shipment without addition of a covering such as a waxed paper bag and stockinette. It has been found to be advantageous to launder and reuse the cloth if it is removed prior to shipment.

As practiced heretofore, in clothing carcasses it has not been possible to control with any degree of accuracy the amount of moisture evaporated from the carcass. The vapor transmission through the cloth has depended largely upon the amount of brine in the cloth, the weight and kind of cloth, temperature and relative humidity of the chilling room, etc. It has not been possible to adjust these factors collectively to secure a predetermined amount of loss of moisture from the carcass.

An object of the invention is to provide a method for treating animal carcasses utilizing an improved clothing which may be retained on the carcass for a longer period of time and which gives a greater reduction in shrinkage than has been secured heretofore.

A further object of the invention is to provide a method of clothing carcasses whereby an improved product is obtained.

Another object of the invention is to provide a method whereby the results of clothing carcasses may be precisely controlled to obtain maximum benefits therefrom.

In accordance with the present invention, animal carcasses are clothed by applying to the surface of the freshly skinned carcass a clothing material comprising a layer of cloth and a layer of plastic material. Such a clothing material has a two-fold purpose. It provides a cloth portion for retarding evaporation of moisture, molding the carcass, bleaching the fat, and absorbing surface blood spots. It also provides a plastic portion which, among other things, regulates the transmission of moisture from the surface of the meat through the cloth. The plastic portion may be in the nature of a coating which partially fills the interstices of the cloth and covers one surface of the cloth thereby semi-moistureproofing the material.

The cloth portion of the plastic coated clothing material may be any preferred or well known textile material suitable for clothing animal carcasses, including woven fabrics, such as cotton sheeting, muslin, rayon fabrics, unbleached plain Osnaburg beef sheeting, etc. Nonwoven fabrics comprising carded or garnetted fibers of resins or plastics, alone or in combination with cotton or other cellulose fibers, may also be used. Such nonwoven fibers are preferably bonded together by heat-treating the fibers or by adhering the fibers together with a suitable bonding agent. Bonded nonwoven fabrics made from blown fibrous mats of resinous or mixtures of resinous and cellulosic fibers are also contemplated. We prefer to use a cotton sheeting which is of lighter weight than the ordinary beef sheeting used heretofore in clothing beef. Whereas the ordinary beef sheeting is of a heavy construction of about 2.10 yards per pound of cotton, we have found a sheeting of about 6 to 7 yards per pound in widths ranging from 27 to 48 inches, construction ranging from 40 x 36 up to 56 x 52, and preferably 6.15 yards per pound of cotton in 36 inch width (40 x 40 construction) to be suitable. The sheeting material should be of a type which will not give excessive thickness or weight to the finished product. In general, it is desirable to use as light weight material as possible and yet secure the desired results.

The plastic portion of the cloth may be any nontoxic plastic material which will impart semi-moistureproofness when applied to the surface of the cloth. In addition, the plastic material should be permeable to air and sufficiently pliable so that the cloth will not be unduly stiffened. Such materials include:

1. Polymerized vinyl chloride and/or acetate;
2. "Pliofilm" (rubber hydrochloride);
3. Polyethylene;
4. Polymerized vinylidene chloride;
5. Ethyl cellulose; or
6. Polyvinyl acetals.

We have found that vinyl chloride copolymers are particularly suitable for our purpose. A plastic material which may be used comprises 98 per cent polymerized vinyl chloride and 2 per cent polymerized vinyl acetate which has been plasticized with a small amount of di-ethylhexyl phthalate.

In the event the plastic material is insufficiently pliable or flexible it is desirable to add a plasticizing agent thereto. Any of the ordinary plasticizing agents for polymers and copolymers may be used, such as N. cyclohexyl paratoluene sulphonamide, butyl phthalyl butyl glycolate, or di-ethylhexyl phthalate. The latter plasticizing agent has been found to be particularly suitable for plasticizing vinyl resins.

The plastic coating may be applied to the cloth in several ways. One method of application is to pass the uncoated cloth over a roller which is being continually coated with a predetermined amount of the plastic material. As the cloth passes over the roller it picks up a film of plastic coating of the desired thickness. The coating is then allowed to dry. In this manner of treatment, it may be desirable to use a solvent and, in that event, provision should be made for evaporation of the solvent from the coating after it has been applied to the cloth.

A second method of applying the plastic coating comprises the lamination of a preformed film with the cloth. In this method a plastic film is preformed to the desired thickness and permeability to moisture and air by any preferred or well known methods of production of thin plastic films. The preformed plastic film of the desired permeability and thickness is then laminated to the cloth. The lamination may be done by any suitable method for laminating film and cloth together, such as bonding by heat treatment or by the use of suitable adhesives. If the film is a thermoplastic material, it may be adhered to the cloth directly by heat, or, if desired, the film may be coated with a thermoplastic material which will bond the film to the cloth by the application of heat. In some cases it may be possible to bond the film and cloth by the mere use of pressure.

Another possible method of coating is to spray the plastic on the cloth so as to give a plastic coating of the desired properties. In this method it is necessary that the plastic material be in a fluid state and it is usually desirable to dissolve the plastic material in a suitable solvent. A sufficient amount of the solution is sprayed on the surface of the cloth so that when the solvent has evaporated a film of the desired characteristics will be secured. It may be desirable to further treat the plastic coated cloth by passing it through a set of rollers which may be heated if necessary.

A finished cloth often contains printing material for purposes such as identification of the product. In the manufacture of our cloth, it is desirable to have the printing material on the coated side of the cloth so that it will be visible on a clothed carcass and will be protected by the plastic. Accordingly, a convenient method of manufacture is to first print the cloth, which has preferably been bleached and desized, and then apply the plastic coating over the printed side of the cloth.

For purposes of further illustrating the invention, reference is now made to the accompanying drawing in which:

Fig. 1 is a diagrammatic sketch of woven cloth intended to be used in the invention magnified about 5 times;

Fig. 2 is a diagrammatic sketch of the same cloth after the application of the plastic coating, also magnified approximately 5 times;

Fig. 3 is a diagrammatic sketch of a cross-section of the plastic coated cloth; and Fig. 4 is a diagrammatic sketch of one form of apparatus for coating the cloth with plastic in accordance with the present invention.

Referring to Fig. 1 of the drawings, a cloth suitable for coating in accordance with the invention is represented generally by the numberal 5. The cloth as shown is a woven cloth composed of fibres 6.

In Figs. 2 and 3 the plastic coating 7 is shown applied to the surface of the cloth. As indicated in Fig. 2 the coating is a continuous film containing irregularly disposed pores or pinholes 8. Although we have shown in the drawing actual openings in the film, all that is required is for the plastic coating to have the characteristics of allowing the proper diffusion of moisture and air.

As shown in Fig. 3, the plastic coating comprises a film which skirts across the interstices of the fiber and is adhered thereto. The coating is a continuous film except for the interspersed pores or small holes.

Referring to Fig. 4, a roll of cloth 10 to be coated is supported on spindle 11. A sheet 12 of the uncoated cloth is passed over a roller 14 which contains a film of plastic material 15 contained in a hopper 16. As the roll passes by the hopper 16 a layer of the coating of the plastic material adheres to the surface of the roll. The thickness of the film on the roll may be controlled by a knife or scraper 18. As the cloth passes over the roller, the film of plastic material thereon is picked up by the sheet of cloth. The cloth is then passed through a dryer 20, which is shown diagrammatically and may be any suitable type of dryer, with or without heat, or which may be merely additional traveling space for the sheet to provide time for evaporation of the solvent. In the chamber 20 may be provided any other conditioning apparatus, such as rollers to further condition the cloth and finish the plastic coated surface. The plastic coated cloth then may be rewound into a roll 21 on a spindle 22.

An important feature of the present invention is the control of the amount of moisture vapor transmission through the plastic film. Such moisture vapor transmission is the function of the permeability and porosity of the coating material. By controlling the degree of moisture vapor transmission the evaporation of moisture from the clothed meat or shrinkage may be regulated. We have found that the moisture vapor transmission rate must be controlled within a fairly definite range and that the observance of this range is critical for the successful practice of the present invention.

We have used a simple method of determining the moisture vapor transmission rate which may be used as a control for the manufacture of a coated cloth having the desired characteristics. A sample of the plastic coated cloth is placed across the opening of a vapometer cup half-filled with calcium chloride. The cloth is securely held in place with a rubber gasket and metal screw clamp. The vapometer cup assembly is accurately weighed and then placed in a room having closely controlled temperature and relative humidity. The calcium chloride in the cup sets up a low relative humidity in the cup and tends to draw moisture through the cloth from the atmosphere surrounding the cup. The cup is allowed to remain in the air-conditioned room or chamber for 24 hours and at that time is reweighed. The gain in weight represents the amount of moisture vapor passing through the coated cloth. This gain in weight is calculated, and the vapor transmission rate is expressed as grams of moisture per 100 square inches per 24 hours from an atmosphere of 85–90 per cent relative humidity at 99° F. to a dry atmosphere. Coated cloth which allows less than about 35 grams per 100 square inches for 24 hours is too moistureproof for our purpose. Coated cloth which has a moisture vapor transmission rate of more than about 70 grams per 100 square inches for 24 hours is not sufficiently moistureproof. We have found that a moisture vapor transmission rate through the coated cloth of about 35 to 55 gives good results and about 40 to 45 grams per 100 square inches for 24 hours represents the preferred range. We have found that this preferred range applies to cloths for all types of animal carcasses.

The condition of the meat at destination is an important factor to be considered in determining the proper moisture vapor transmission rate of the cloth. If the cloth is too moistureproof, a moist or slimy meat surface may result due to the setting up of favorable conditions for the growth of surface organisms. On the other hand, if the cloth is insufficiently moistureproof, the surface of the meat dries and the carcass loses excessive weight and its desirable fresh appearance. While we have indicated above a certain operative range and a certain preferred range of moistureproofness, these conditions may be varied depending upon the technic in dressing the carcass. For example, if it is possible to dress the carcass under such conditions that the surface of the meat is substantially free from bacteria or contamination, it may be possible to use a cloth which would have a considerably lower moisture vapor transmission rate. If it is possible to chill and ship the carcass at a controlled temperature of 29° to 31° F., a more moistureproof cloth may be used. As improvements in the technic of handling carcasses occur in the art, it is possible that cloths may be used which approach substantial moistureproofness. Therefore, we do not desire to be limited to the exact ranges specified above as these may be varied depending on operating conditions. As more ideal conditions of dressing carcasses are approached, we contemplate that a cloth of moistureproofness in the region of 15 to 20 grams may be used.

It is to be understood that moisture vapor transmission rates are merely a means of control on the type of cloth to be used. It is possible that these rates may be correlated with other standards, or other standards may be substituted for moisture vapor transmission rate in standardizing the type of cloth. We have in mind in this connection that such control tests as porosity or thickness of plastic, etc., may be used as standards for plastic coated cloth. Any other standards which are equivalent to or capable of being correlated with moisture vapor transmission rate may be used. In any event it is desirable that the standards be based on or related to the moisture vapor transmission rate of the cloth.

For purposes of illustration we set forth in the following table data secured from extensive tests on lamb carcasses using plastic coated cloths of varying moisture transmission rates:

| Moisture Transmission Rate | Carcass Shrinkage After 7 Days | Appearance of Carcass After 7 Days |
| --- | --- | --- |
| High—55 and above | 3.0 to 5.0% | Dry surface. |
| Low—35 and below | 0.0 to 2.0% | Moist flanks, some off odor. |
| Preferred—40–45 | 2.0 to 3.0% | Fresh color, lots of bloom, no off odors. |
| No cloth | 4.0 to 5.0% | Dry surface, color of lean dark, lacks bloom. |

In the above table the moisture vapor transmission rate in columne 1 is the loss of moisture through the cloth in grams for 24 hours per 100 square inches at 88% R. H. and 99° F.

The procedure of applying the plastic coated cloth to the freshly skinned carcass may be substantially the same in our invention as practiced heretofore. For example, the cloth is draped tightly around the carcass immediately after skinning on the killing floor. The clothed carcass is then transferred to the chilling room.

In conventional practice, the uncoated cloth is kept on the carcass for approximately 24 hours, and then removed, laundered and reused. The carcass is then generally maintained bare until it reaches the consumer except that in cases where it is desirable to cover the carcass with peach market paper and stockinette to protect the meat during shipment.

In accordance with the present invention, instead of removing the plastic coated cloth after 24 hours we prefer to maintain the plastic coated cloth on the carcass during chilling, shipping, and marketing. The clothing of the present invention, in contrast to prior art practice, protects the carcass against shrinkage and impairment of appearance beyond the 24-hour period and as long as the cloth is kept on the meat.

In accordance with our invention best results are obtained by applying the cloth with the uncoated side next to the surface of the meat. This is desirable because the uncoated side of the cloth is needed to hold the brine, to absorb blood spots, and to give the desired bleached color to the fat. If the plastic coated side is placed next to the carcass, it has been found that the surface of the carcass often presents a fiery appearance.

The present invention is to be distinguished from handling of carcasses and meat cuts of the prior art wherein the product is covered with separate packaging materials, including a cloth and a transparent wrapper, such as cellophane or other ordinary cellulosic materials, polymerized rubber films, polyethylene films, etc. Such wrappers have been used for packaging frozen products to secure moistureproofness and for fresh meat products for the retail trade. Such packaging methods are not suitable for clothing freshly skinned carcasses and do not produce the results of the present invention. In those cases the moisture vapor transmission rates are far too low to secure the results comparable to those obtained with the present invention.

An advantage of the present invention is that the cloth may be left on the carcass for a longer period of time than with ordinary cloths as used heretofore. For example, the plastic coated cloth of the present invention may be left on the carcass during its entire period of handling, including chilling, shipping, marketing, and holding by the retail meat dealer. During this entire period the advantages of clothing the carcass with respect to decrease in shrinkage and maintenance of good appearance of the carcass are secured. Whereas the conventional cloth dries out and loses much of its effectiveness, the cloth of the present invention retains all of its advantages during the entire period that it is on the carcass.

A further advantage of the present invention is an improved product. Since the cloth can be left on the carcass from the time the skin is removed until the carcass reaches the consumer, there is substantially no contamination of the meat. The desirable fresh appearance of the carcass is maintained over the entire shipping and marketing period because of the closely regulated rate of moisture vapor loss from the surface of the carcass. The treatment of the carcass in accordance with the present invention preserves the bloom and freshness of color by eliminating the drying of the surface, which accompanies excessive weight loss.

Also, an important advantage of the present invention is the reduced shrinkage of the animal carcass when using the method of clothing herein disclosed. It is contemplated that substantial reduction in loss of weight during handling of the carcasses in the order of 25 to 35 per cent may be realized.

The term "animal carcasses" as used in the specification and claims is intended to mean the carcasses of beef, lamb, pork, and veal, and many include whole carcasses or the major cuts thereof, such as sides or quarters.

The term "plastic material" as used in the claims is intended to mean a heat-softening or thermoplastic material which is nontoxic, semi-moistureproof, air-permeable, and pliable.

Although the invention has been described above in connection with clothing of animal carcasses, the invention is also applicable to the packaging or wrapping of other meat products and other food products. For example, the cloth herein described may be used for covering pork sausage, cheese, etc., or for any products wherein it is desirable to control the escape of moisture therefrom.

Obviously, many modifications and variations of the invention as hereinbefore set forth may be made without departing from the spirit and scope thereof, and therefore only such limitations should be imposed as are indicated in the appended claims.

We claim:

1. The method of treating an animal carcass which comprises applying to the freshly-skinned surface of the carcass a plastic-coated clothing material, said coated clothing material having a vapor transmission rate of about 15–70 grams of moisture per 100 square inches per twenty-four hours from an atmosphere of 85–90% relative humidity at 99° F. to a dry atmosphere.

2. The method of treating an animal carcass which comprises applying to the freshly-skinned surface of the carcass a plastic-coated clothing material, said coated clothing material having a vapor transmission rate of about 35–70 grams of moisture per 100 square inches per twenty-four hours from an atmosphere of 85–90% relative humidity at 99° F. to a dry atmosphere.

3. The method of treating an animal carcass which comprises applying to the freshly-skinned surface of the carcass a plastic-coated clothing material, said coated clothing material having a vapor transmission rate of 40–45 grams of moisture per 100 square inches per twenty-four hours from an atmosphere of 85–90% relative humidity at 99° F. to a dry atmosphere.

4. The method of treating an animal carcass which comprises applying the uncoated side of a fabric, coated only on one side with a plastic material, to the freshly-skinned surface of the carcass, the coated fabric having a vapor transmission rate of about 15–70 grams of moisture per 100 square inches per twenty-four hours from an atmosphere of 85–90% relative humidity at 99° F. to a dry atmosphere, and maintaining said clothing material on the carcass, thereby improving the appearance and decreasing shrinkage of the carcass.

5. The method of treating an animal carcass which comprises applying the uncoated side of a fabric, coated only on one side with a plastic material, to the freshly-skinned surface of the carcass, the coated fabric having a vapor transmission rate of about 35–70 grams of moisture per 100 square inches per twenty-four hours from an atmosphere of 85–90% relative humidity at 99° F. to a dry atmosphere, and maintaining said clothing material on the carcass, thereby improving the appearance and decreasing shrinkage of the carcass.

6. The method of treating an animal carcass which comprises applying the uncoated side of a fabric, coated only on one side with a plastic material, to the freshly-skinned surface of the carcass, the coated fabric having a vapor transmission rate of 40–45 grams of moisture per 100 square inches per twenty-four hours from an atmosphere of 85–90% relative humidity at 99° F. to a dry atmosphere, and maintaining said clothing material on the carcass, thereby improving the appearance and decreasing shrinkage of the carcass.

7. The method of treating an animal carcass which comprises covering the freshly-skinned surface of the carcass with a cloth coated with a plastic material, said coating partially closing the interstices of the cloth and thereby retarding the rate of moisture loss from the carcass sufficiently to substantially reduce shrinkage of the carcass without at the same time impairing the quality of the meat while said cloth is maintained on said carcass, the coated cloth having a vapor transmission rate falling within the range of about 15–70 grams of moisture per 100 square inches per twenty-four hours from an atmosphere of 85–90% relative humidity at 99° F. to a dry atmosphere, and maintaining said cloth on the carcass during subsequent handling operations.

References Cited in the file of this patent

UNITED STATES PATENTS

| Number | Name | Date |
|---|---|---|
| 1,837,555 | Kratz | Dec. 22, 1931 |
| 1,981,909 | Dunn et al. | Nov. 27, 1934 |
| 2,066,079 | Shoub | Dec. 29, 1936 |
| 2,068,456 | Hooper | Jan. 19, 1937 |
| 2,149,713 | Webber | Mar. 7, 1939 |
| 2,314,300 | Williams et al. | Mar. 16, 1943 |
| 2,418,904 | Rugeley et al. | Apr. 15, 1947 |
| 2,424,777 | Stuart | July 29, 1947 |

(Other references on following page)

UNITED STATES PATENTS

| Number | Name | Date |
|---|---|---|
| 2,453,441 | La Fair | Nov. 9, 1948 |
| 2,467,792 | Wenzel et al. | Apr. 19, 1949 |

FOREIGN PATENTS

| Number | Country | Date |
|---|---|---|
| 18,380 of 1934 | Australia | Jan. 23, 1936 |

OTHER REFERENCES

Modern Packaging," December 1944, pages 122, 123, 158, and 160, article entitled "Polyethylene . . . its packaging possibilities."

"Scientific American," June 1947, page 258.